United States Patent
Dalal et al.

(10) Patent No.: US 8,305,667 B2
(45) Date of Patent: Nov. 6, 2012

(54) SYSTEMS AND METHODS FOR FORMING A TINT OF A SPOT COLOR

(75) Inventors: Edul N. Dalal, Webster, NY (US); Wencheng Wu, Webster, NY (US); Raja Bala, Webster, NY (US)

(73) Assignee: Xerox Corporation, Norwalk, CT (US)

(*) Notice: Subject to any disclaimer, the term of this patent is extended or adjusted under 35 U.S.C. 154(b) by 869 days.

(21) Appl. No.: 12/424,586

(22) Filed: Apr. 16, 2009

(65) Prior Publication Data

US 2010/0265522 A1    Oct. 21, 2010

(51) Int. Cl.
 *H04N 1/46* (2006.01)
(52) U.S. Cl. .......... 358/525; 358/1.9; 358/518
(58) Field of Classification Search .......... 358/1.9, 358/3.23, 518, 523, 525
See application file for complete search history.

(56) References Cited

U.S. PATENT DOCUMENTS

| | | | |
|---|---|---|---|
| 6,483,607 B1 * | 11/2002 | Van de Capelle et al. | 358/1.9 |
| 7,032,517 B2 * | 4/2006 | Bestmann | 101/484 |
| 2008/0043264 A1 * | 2/2008 | Gil et al. | 358/1.9 |

OTHER PUBLICATIONS

U.S. Appl. No. 12/016,353, filed Jan. 18, 2008, Guo-Yau Lin et al.
Edited by Gaurav Sharma, Digital Color Imaging Handbook, 2003, pp. 1-114, CRC Press LLC, 2000 N.W. Corporate Blvd., Boca Raton, Florida 33431.

* cited by examiner

*Primary Examiner* — King Poon
*Assistant Examiner* — Jamares Q Washington
(74) *Attorney, Agent, or Firm* — Oliff & Berridge, PLC (57) ABSTRACT

Systems and methods are provided for rendering tints of spot color objects or target colors between a spot color and a second color in image forming devices. In particular the systems and method provided allow for a sweep of a spot color to be rendered accurately, without discontinuities when transitioning from the tint to the solid spot color. The systems and method will prevent discontinuities even if the solid spot color has been modified by a user.

22 Claims, 3 Drawing Sheets

SYSTEMS AND METHODS FOR FORMING A TINT OF A SPOT COLOR

BACKGROUND

This disclosure is directed to systems and methods for maintaining constant or desired hue trajectory across a range of tint variations of spot colors or for rendering a target color lying between a pair of spot colors according to a desired color trajectory between the two spot colors, within images formed in an image forming device.

Color images are commonly represented in image forming systems as a series of discrete separations. Each separation comprises a set of color signals for one primary color. Color images prepared for printing typically comprise four primary color signals, i.e., cyan (C), magenta (M), and yellow (Y), and black (K) signals, each signal corresponding to a particular process ink of that color. Together, these CMYK signals may be considered the colorant signals in a particular image forming device. Because the use of CMYK is well understood in the art, further explanation regarding its use and function in rendering images need not be articulated here. Furthermore, some image forming systems enable the use of more than 4 process inks, thereby producing a larger gamut, or range of colors. For the rest of the disclosure, we will use the case of CMYK primaries to teach the concepts, with the understanding that the ideas extend in a straightforward fashion to extended colorant sets.

Additionally, the use of spot colors is also well known in the art. These spot colors refer to accepted, and identified, shades of color, and have traditionally been implemented using special inks which are unique to the particular spot color. One of the best known examples of spot colors is the Pantone color scheme. However, because the use of true spot colors is expensive and inconvenient, for many applications several methods for emulating spot colors in image forming systems exist. Such emulation can be carried out using the CMYK process inks, or where the image forming systems allow, additional process inks may be used to more closely emulate the spot colors. Although for simplicity spot color emulation is discussed in this document primarily in terms of emulation using CMYK process inks, it is to be understood that all forms of emulation, including the use of more than four process inks, is likewise covered.

One widely known conventional method for spot color emulation, and/or spot color rendering, in image forming devices is basically understood as follows. In this method, spot colors can be described in the applicable page description language ("PDL") such as PostScript, or PDF. In addition, tints of the spot colors typically can be described in the PDL. During raster image processing ("RIP") in the digital front end ("DFE"), spot colors are detected, and a predetermined CMYK recipe for rendering the spot color is retrieved from generally a pre-stored table of values for each corresponding spot color.

The emulation of spot colors using CMYK recipes, or even recipes involving more than 4 process inks, is fairly well defined when printing the spot color with a full (100%) tint. However, printing tints of the spot colors using this method is typically not well defined. In some previously used methods, when printing a tint of 40% for a spot color, the tint would be emulated by likewise using a 40% recipe of each of the CMYK colors in the spot color emulation recipe. This would often result in inappropriate representations of the true tint of the spot color. In particular, the gradation of tints over a full sweep would often be inconsistent. In other words, the hue of the tint, or of a sweep formed by a series of tints, would be inconsistent.

In an effort to improve the accuracy of tint rendition of spot colors in sweeps an alternate method was used in which, instead of retrieving predetermined CMYK values directly from a pre-stored table, a device independent target is retrieved in a color space representative of the spot color and converted to a CMYK value for rendering the spot color image.

As described, for example, in chapter 1 of the *Digital Color Imaging Handbook*, edited by Gaurav Sharma (CRC Press, 2003) and incorporated herein by reference, color may be measured in terms of three components which are often referred to as $L^*$, $a^*$ and $b^*$, which define parameters by which any color may be specified in the coordinate system. In an $L^*a^*b^*$ system, $L^*$ generally corresponds to a lightness-darkness scale value, $a^*$ generally corresponds to a red-green scale value, and $b^*$ generally corresponds to a yellow-blue scale value. Appropriate $L^*a^*b^*$ values, for emulating spot color, are looked up from a table, and are converted to CMYK values to achieve the final CMYK recipe. The $L^*a^*b^*$ values are device independent, and the CMYK values are device dependent. This conversion process utilizes a color transformation mechanism in the RIP.

To emulate the tints in the sweep various methods have been applied to the $L^*a^*b^*$ values of the solid spot color, referred to herein as the base set of color space values. For example, linear interpolation was used as a method. The use of a color space system, such as the $L^*a^*b^*$ system results in a more perceptually constant hue over the sweep. However, discontinuities would often be evident between the final tint approaching the true spot color and the spot color itself, due to unavoidable discrepancies between the recipe calculated from the target $L^*a^*b^*$ color and the recipe in the spot color emulation table. Additionally, many spot color emulation systems allow a user to personalize the CMYK recipe used to emulate the spot color. Altered CMYK recipes would result in even more discontinuity between the spot color emulation, and the tints derived from the independent, and unaltered $L^*a^*b^*$ value tints.

SUMMARY

In an effort to solve the problems identified above, it would be advantageous to provide an improved system that provides a constant perceived hue or other desired trajectory to tints of spot colors, while avoiding discontinuities between the tints and the true spot color.

The systems and methods according to this disclosure may allow for the improved formation of tints and sweeps of spot colors by converting a device colorant recipe (such as CMYK) for the spot color to referencing component values of a color space (such as $L^*a^*b^*$). This will allow the accurate calculation of tints, by using the color space, while avoiding discontinuities between the tints and the original spot color.

In various exemplary embodiments, the system and methods according to this disclosure may form a target color in an image, the target color being intermediate between a spot color and a second color. Specifically, a computer implemented method may implement the following steps: first the method would receive device colorant recipes for the spot color and the second color. The method would also receive a mixture percentage value indicating the proportion of the spot color relative to the second color. Next, the method would convert the device colorant recipes for the spot color and the second color to respective base sets of color space values. The method would then calculate a set of color space values corresponding to the target color based on (1) the base sets of color space values of the spot color and the second color, and (2) the mixture percentage value that indicates the proportion of the spot color relative to the second color. The method would then determine a device colorant recipe that produces the set of color space values for the target color. Finally, a method would form an output image containing the target color.

In further embodiments the second color is white. The white value would be represented, in this embodiment, by a device colorant recipe with zero values for each colorant. Thus, the target color would be a tint of the spot color. However, the second color may also be a second spot color with a second device colorant recipe associated with it.

In yet a further embodiment, some steps would be taken in an offline phase. Specifically, the steps of receiving, converting, calculating and determining of target colorant recipes would be pre-executed for a set of N intermediate nodes, $1 \leq N \ll 100$, corresponding to predetermined mixture percentage values would be undertaken in an offline phase. Additionally, the colorant recipes of the spot color and the second color, corresponding respectively to 100 and 0 mixture percentage values, would be added to the set of nodes in the offline phase. Then, in a real-time phase, the colorant recipe of the target color corresponding to a percentage value would be calculated by interpolation among colorant recipes at selected nodes.

In further embodiments, the interpolation used would be linear interpolation and the selected nodes would be the two nodes corresponding respectively to mixture percentage values immediately less than and greater than that of the target color.

In further exemplary embodiments, the device colorants would be CMYK colorants, optionally with additional process colorants. In further exemplary embodiments, the output image would contain a sweep which is generated as a series of target colors corresponding to a progressive sequence of mixture percentage values. In an alternate further embodiment, the output image may be a monochrome pictorial which is generated as a collection of tints.

In further embodiments, the referencing components of the color space would include L*, a* and b*. In further exemplary embodiments the CMYK recipe at the spot color would be obtained from a predetermined table and in yet further embodiments the CMYK recipe of the spot color would be determined from a user customizable table of predetermined values.

In further exemplary embodiments of the method, the set of referencing component values of the color space forming the target color corresponding to a mixture percentage value of the two colors for the target color, would be calculated using the formula $$(L_n, a_n, b_n) = (L_0 + n \cdot (L_1 - L_0), a_0 + n \cdot (a_1 - a_0), b_0 + n \cdot (b_1 - b_0))$$

where $L_1, a_1, b_1$ is the base set of referencing component values of the color space, $L_0, a_0, b_0$ is the base set of referencing component values of the color space for the second color, and n is a mixture percentage of the two colors for the target color. For exemplary embodiments forming tints, $L_0, a_0, b_0$ would be the color of the white paper and n would be the tint fraction (percentage) of the spot color.

In further exemplary embodiments of the method, each step of converting the set of component values of the color space to the CMYK recipe contains the further step of fixing a $K_n$ value for the recipe according to the formula $$K_n = K_0 + n \cdot (K_1 - K_0)$$

and selecting $C_n$, $M_n$ and $Y_n$ values corresponding to $K_n$ that produce the desired color space referencing component values. In these equations, n is a mixture percentage of the two colors, $K_1$ is the K colorant of the solid spot color and $K_0$ is the K colorant of the second color. In a further embodiment of this method, the step of selecting the $C_n$ $M_n$ and $Y_n$ values corresponding to the $K_n$ is accomplished by iterating on a forward printer model. In yet further embodiments of the method, if a valid CMYK recipe does not exist using the $C_n$ $M_n$ and $Y_n$ values corresponding to $K_n$ for the desired color space referencing component values, a valid CMYK recipe is selected having a K as close as possible to the desired $K_n$.

In further exemplary embodiments, the method comprising the further step of converting the set of component values of the color space to the CMYK recipe contains the further step of selecting a CMYK recipe that minimizes a cost function. In further exemplary embodiments of this method, the cost function is given by $$\Sigma [w_c \cdot (C_{Tn} - C_n)^2 + w_m \cdot (M_{Tn} - M_n)^2 + w_y \cdot (Y_{Tn} - Y_n)^2 + w_k \cdot (K_{Tn} - K_n)^2]$$

where $C_n$, $M_n$, $Y_n$, $K_n$ are the device colorant recipes corresponding to the mixture percentage n (or an n-percent tint), and $C_{Tn}$, $M_{Tn}$, $Y_{Tn}$, $K_{Tn}$ are predetermined target recipe values for the mixture percentage n, and $w_c$, $w_m$, $w_y$, $w_k$ are predetermined or dynamically-determined weighting coefficients. Continuing in yet further preferred embodiments, the predetermined target recipe values are those of an adjacent mixture percentage that has already been calculated. In yet an alternate further embodiment, the predetermined target recipe values are determined by linearly interpolating between the recipes for the colorant recipes of the spot color and the second color at the n-mixture percentage, and in yet a further exemplary embodiment, the weighting coefficients are $w_c=1$, $w_n=1$, $w_y=1$ and $w_k=3$.

In various exemplary embodiments, an apparatus for printing a spot color object having a target color intermediate between a spot color and a second color, represented by a mixture percentage value that indicates the proportion of the spot color relative to the second color comprises: an input unit for inputting a spot color object; a first converting unit for converting a device colorant recipe for emulating a spot color and a second color to base sets of referencing component values of a color space; a processor for calculating a desired set of referencing component values of the color space, representing the target color intermediate between the spot color and the second color, represented by a mixture percentage value that indicates the proportion of the spot color relative to the second color; a second converting unit for converting the set of referencing component values of the color space to a device colorant recipe; and an image sink for rendering the target color as at least a portion of an output image.

In further exemplary embodiments, it is anticipated that other devices may be manufactured that perform the methods described above. Additionally, in further exemplary embodiments a xerographic image forming device may include a system performing the above methods. Finally, in further exemplary embodiments one may store on a computer readable storage medium a program for causing a computer to execute the above disclosed methods.

These and other features and advantages of the disclosed systems and method are described in, or apparent from the following detailed description of various exemplary embodiments.

BRIEF DESCRIPTION OF THE DRAWINGS

Various exemplary embodiments of disclosed systems and methods for rendering tints of spot colors will be described, in detail, with reference to the following drawings, wherein.

EMBODIMENTS

The following description of embodiments illustrates examples of systems and methods for modifying image quality in output images, particularly hard-copy output images, based on determining an appropriate method for rendering a target color intermediate between a spot color and a second color, represented by a mixture percentage value that indicates the proportion of the spot color relative to the second color, from among a plurality of methods, based on advantages and disadvantages of each of the methods. The following detailed description of various exemplary embodiments of systems and methods for image quality adjustment, and particularly for maintaining a specified hue trajectory, of a spot color, across a range of desired or required mixture percentage values, may refer to one specific type of image forming device, such as, for example, an electrostatic or xerographic image forming device. The following description may include discussion of various terms relating to image formation, and/or image quality adjustment within such an image forming device, for the sake of clarity, and ease of depiction and/or description. It should be appreciated, however, that although the systems and methods according to this disclosure may be applicable to such a specific application, the depictions and/or descriptions included in this disclosure are not intended to be limited to any specific application, any specific type of image forming device, or any specific image rendering system. It should be understood that any system and/or method for image forming that may advantageously apply the image quality adjustment method and/or spot color rendering parameters described in this disclosure are contemplated.

In referring to, for example, image forming devices, as this term is to be interpreted in this disclosure, such devices may include, but are not limited to, printers, monitors, displays, xerographic, thermal and inkjet image forming devices, and multi-function devices ("MFD"). These devices may include one or more of the functionalities normally associated with the above-enumerated individual image forming devices, and/or any other now known or later-developed systems or devices for producing, reproducing and/or potentially transmitting or receiving high quality color images.

A target color intermediate between a spot color and a second color reduces to a special case of a tint of the spot color, if the second color is the white color of the medium on which the spot color is rendered. In that special case, the mixture percentage value that indicates the proportion of the spot color relative to the second color is known simply as the tint value. In the rest of the disclosure, for the sake of simplicity, we will teach the concepts of the invention referring primarily to the special case of a tint of a spot color. However, it should be understood that, unless otherwise stated, the discussion applies to the general case of a target color intermediate between a spot color and any second color.

The two most common methodologies currently known to obtain final CMYK value (recipe) for rendering a tint of a spot color include (1) calculating a tint based on a pre-calibrated CMYK recipe for the spot color and for the particular image forming device involved, from a table that is normally stored within the image forming device, or (2) calculating a tint based on looking up target values specified in a device-independent coordinate system that define a color space for the image forming device. In this latter instance, a common coordinate system may be measured in terms of three components: L* which corresponds to a lightness-darkness scale, a* which roughly corresponds to a red-green scale, and b* which corresponds to a yellow-blue scale. Obtained L*a*b* values are then converted to a CMYK recipe on the fly. The former approach provides spot color tints that do not have a desirable perceived color rendering for tint values less than 1. The latter approach provides color management that can achieve a desired color rendering but, unlike the former approach, results in a discontinuity as tint values approach 1.

In various exemplary embodiments, the systems and methods according to this disclosure provide a combination spot color object rendering system that attempts to capitalize on the advantages of each of the above-described methods while mediating the disadvantages associated with those methods.

Figure 1:
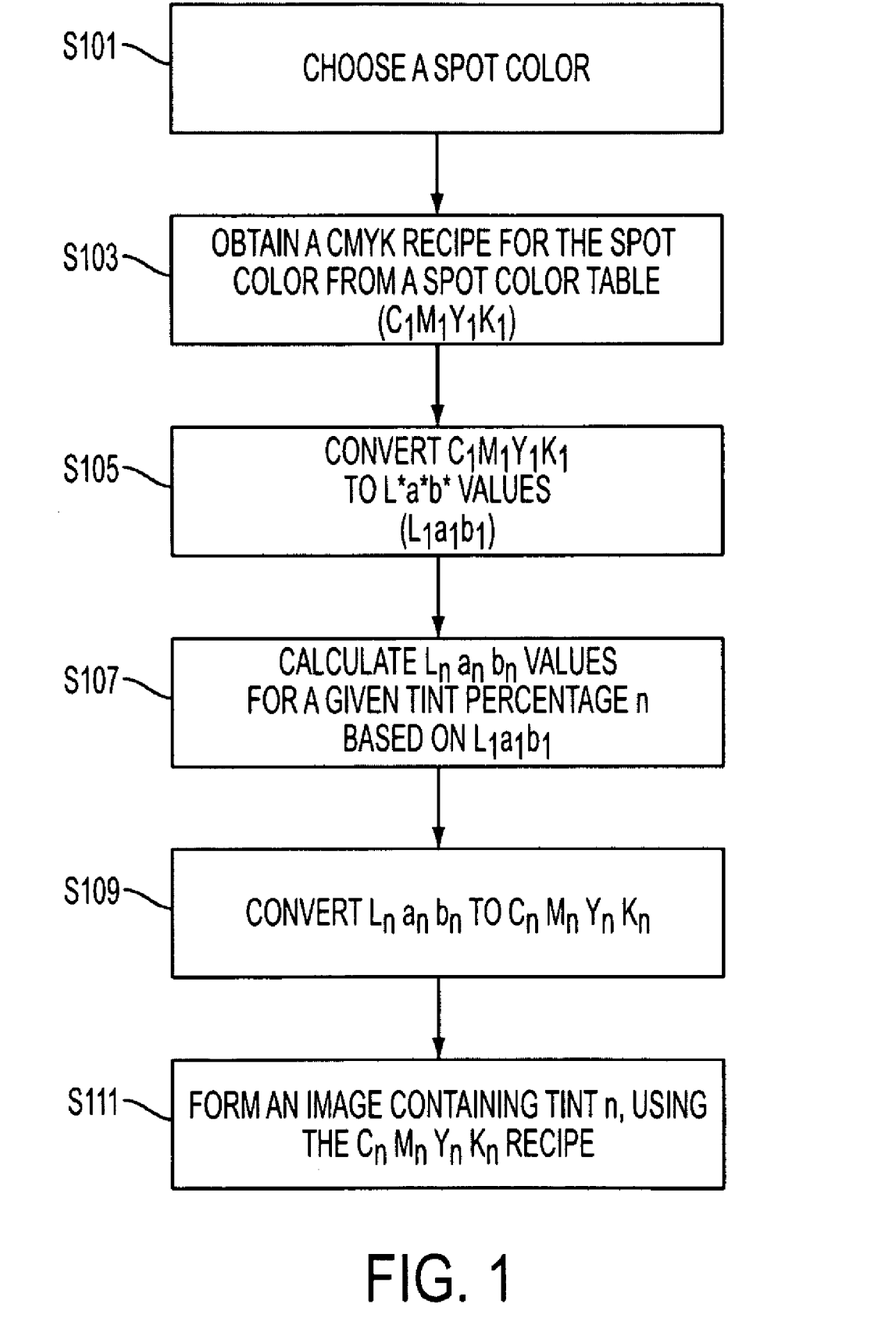
FIG. 1 illustrates a flow chart of an exemplary embodiment of a method for rendering tints of spot color objects according to this disclosure.

FIG. 1 illustrates a flow chart of an exemplary embodiment of a method for rendering tints of a spot color according to this disclosure.

Operation of the method commences at step 101. In step 101 a spot color is selected. In step 103 a CMYK recipe is obtained for the spot color from a table. This CMYK recipe of the spot color, which will be designated $C_1M_1Y_1K_1$ will typically be image forming device dependent. It may also be user customizable, and indeed may have actually been altered by the user prior to this method. Once $C_1M_1Y_1K_1$ has been calculated, in step 105 the recipe is converted to a base set of L*a*b* values, designated here as $L_1a_1b_1$.

Once the base set $L_1a_1b_1$ is calculated, in step 107, one or more tint values of this base set can be calculated. For any given tint percentage (n), the tint values will be designated here as $L_na_nb_n$. One such method for calculating the tint values is linear interpolation. For example, this process may utilize the formula:

$$(L_n, a_n, b_n) = (L_0 + n \cdot (L_1 - L_0), a_0 + n \cdot (a_1 - a_0), b_0 + n \cdot (b_1 - b_0)) \quad (1)$$

As noted above, $L_1, a_1, b_1$ is the base set of referencing component values of the color space. Furthermore, $L_0, a_0, b_0$ is the color of the paper white, and as discussed above, n is a tint percentage of the spot color along the sweep.

However, it will be appreciated by those of ordinary skill in the art that this is simply an exemplary method of calculating tint values in the Lab color space. Numerous other different methods of modifying L*a*b* values to tint values may be defined, and can be used in this method.

Once the tint value, or values, have been calculated in the Lab color space, they are converted back to CMYK recipes in step 109. The recipes for each tint converted are designated here as $C_nM_nY_nK_n$. Again, numerous different potential methods exist for converting the $L_na_nb_n$ values to the $C_nM_nY_nK_n$. These will be discussed below shortly.

Finally, in step 111 an image is formed containing the tint of the spot color, using the $C_nM_nY_nK_n$ recipe calculated in step 109.

In addition to objects filled with a constant color described as a tint of a spot color, it is also possible to have sweeps from one tint value to another, such as a sweep from 0% (white) to 100% (solid spot color). Such sweeps can be described simply as a series of tints over the appropriate range of values. Moreover, tints or sweeps are not necessarily confined to spanning the range between a single spot color and white. The sweeps (or the "tints" of which they are comprised) may instead span the range from one spot color to another spot color. Still the basic methodology is the same, namely to receive CMYK recipe values for the two extreme colors that form the endpoints of the sweep, convert these to L*a*b* base color space values, define a trajectory that begins with one base color and ends at the other base color, and derive CMYK recipe values for any color on the trajectory that corresponds to a percentage mixture of the two base colors.

As noted earlier, there are multiple different ways to obtain a CMYK recipe from a set of L*a*b* values. Furthermore, it should be appreciated that more than one CMYK recipe may exist which can replicate the colors defined by a given set of L*a*b* values. Therefore, this disclose will now discuss several exemplary methods for converting the L*a*b* values obtained for a given tint to a CMYK recipe.

Figure 2:
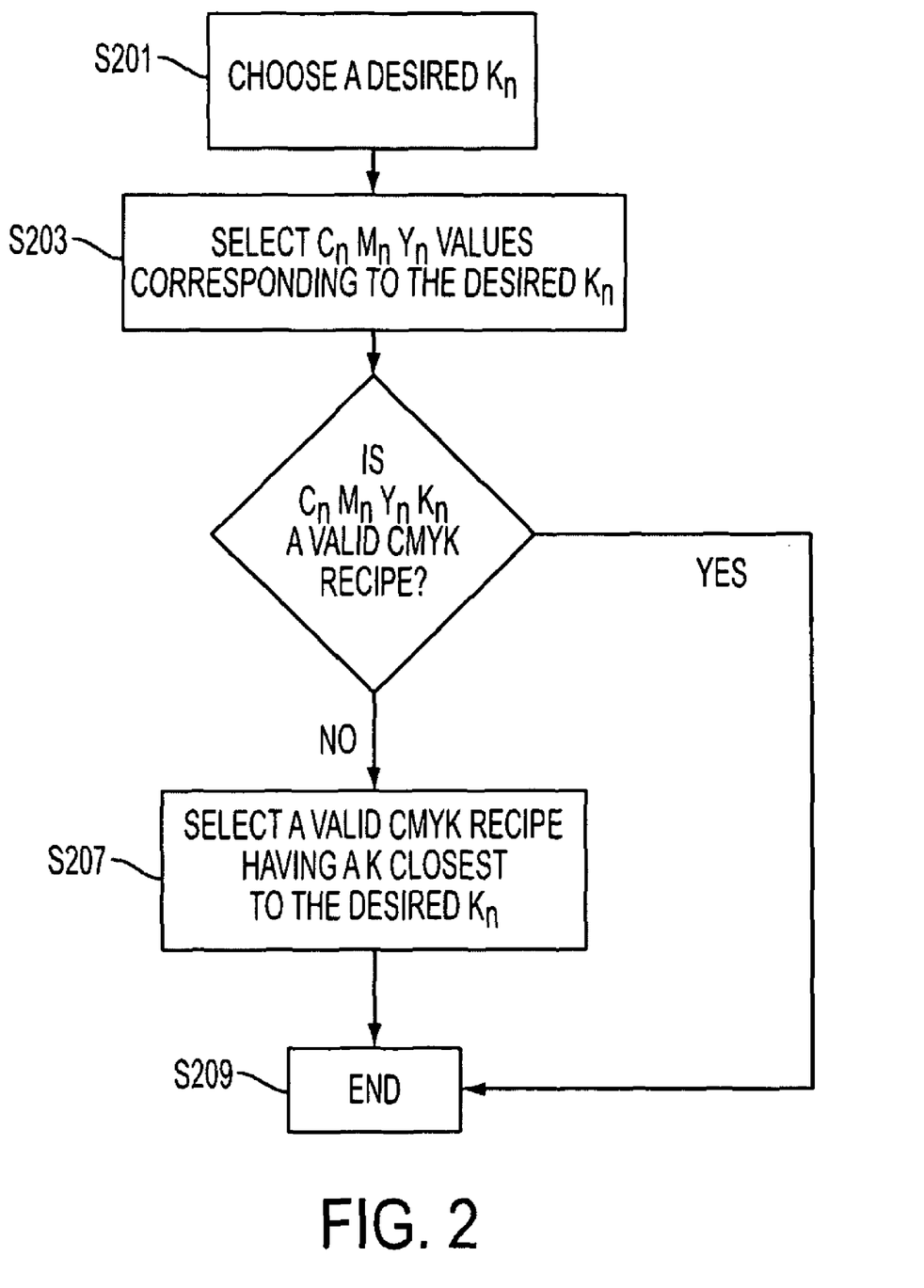
FIG. 2 illustrates a flow chart of an exemplary embodiment of converting $L_n$, $a_n$, $b_n$ values to a CMYK recipe according to this disclosure.

FIG. 2 illustrates a potential method for converting the L*a*b* values obtained for a given tint to a CMYK recipe. The process illustrated in FIG. 2 is an expansion of step 109, from FIG. 1. As such, it is presumed at the start of this potential method that a set of L*a*b* values for the given tint $(L_n a_n b_n)$ are already known.

The process begins at step 201, in which the method selects a desired $K_n$ value for the final recipe. In further exemplary embodiments, $K_n$ may be chosen based on the formula:

$$K_n = n \cdot K_1 \qquad (2)$$

Once the desired $K_n$ value has been selected, in step 203 a set of $C_n, M_n, Y_n$ values are calculated that will reproduce the desired color $L_n a_n b_n$ based on the pre-selected $K_n$. The process of calculating $C_n, M_n, Y_n$ may involve the further step of inverting a forward printer model. As the concept of the forward printer model is well known in the art, no further discussion of this concept will be presented here.

Once a set of $C_n, M_n, Y_n, K_n$ values have been selected in step 203, step 205 determines if the selected set of values correspond to a valid CMYK recipe. If the values are a valid CMYK recipe, the method ends in step 209, and for example, returns to step 111 in the previously discussed method for image formation.

However, if step 205 determines that the CMYK recipe is not valid, the process moves to step 207. In step 207 a valid recipe, from among a list of known valid recipes, is chosen having the closest K value to the desired $K_n$ value.

Another exemplary method for obtaining a CMYK recipe, from a set of L*a*b* values for the given tint $(L_n a_n b_n)$ is to select $C_n, M_n, Y_n, K_n$ such that they minimize a cost function. In a further exemplary embodiment, the cost function used to select $C_n, M_n, Y_n, K_n$ is the formula:

$$\Sigma [w_c \cdot (C_{Tn} - C_n)^2 + w_m \cdot (M_{Tn} - M_n)^2 + w_y \cdot (Y_{Tn} - Y_n)^2 + w_k \cdot (K_{Tn} - K_n)^2] \qquad (3)$$

In this formula, $C_{Tn}, M_{Tn}, Y_{Tn}, K_{Tn}$ are predetermined target recipe values for that n-percent tint, and $w_c, w_m, w_y, w_k$ are pre-determined or dynamically-determined weighting coefficients. In one embodiment, the predetermined target recipe values $C_{Tn}, M_{Tn}, Y_{Tn}, K_{Tn}$ are those of an adjacent tint that has already been calculated. In one embodiment, the predetermined target recipe values $C_{Tn}, M_{Tn}, Y_{Tn}, K_{Tn}$ are those determined by linearly interpolating between the solid spot color and the substrate white, at the n-percent tint. In yet a further exemplary embodiment, the weighting coefficients may be set to the values $w_c = 1, w_m = 1, w_y = 1$, and $w_k = 3$.

In yet another exemplary method, the CMYK recipes corresponding to N predetermined tint values, referred to as tint nodes, are calculated in an offline phase using any of the aforementioned techniques. The colorant recipes for 0% tint (i.e. media white) and 100% tint (i.e. the solid spot color) are added to the set of nodes. Then in a real-time phase, the colorant recipe of a tint color corresponding to a tint value different from those at the nodes is calculated by interpolation among colorant recipes at selected nodes. Many forms of interpolation techniques exist; in one exemplary embodiment, piecewise linear interpolation can be used.

As noted earlier, however, other potential methods for calculating the CMYK recipe corresponding to the set of L*a*b* values for the given tint $(L_n a_n b_n)$ are also anticipated to be used, where they may be more appropriate.

Figure 3:
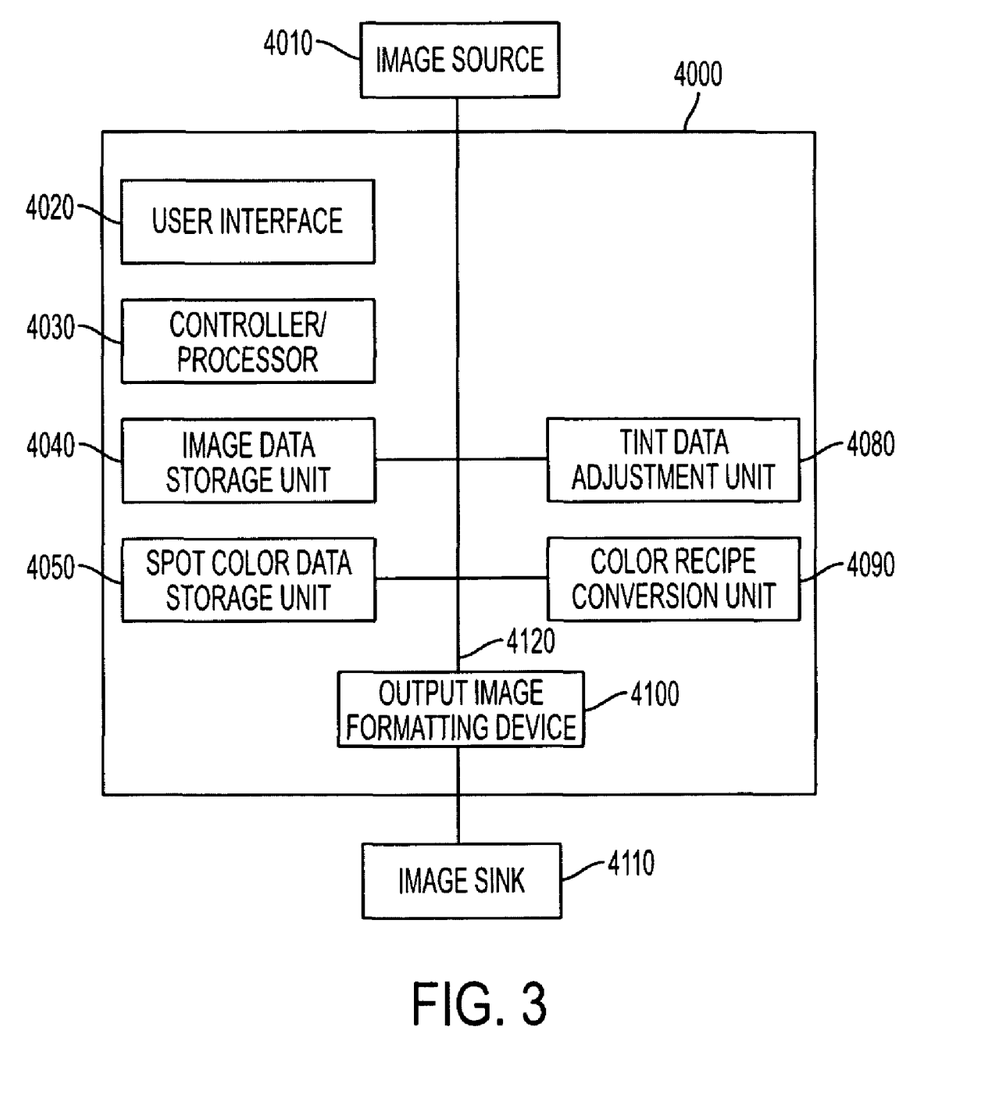
FIG. 3 illustrates a block diagram of a system for object and tint oriented spot color rendering according to this disclosure.

FIG. 3 illustrates a block diagram of a system for spot color rendering according to this disclosure. As shown in FIG. 3, an image quality adjustment system 4000 may include, or be incorporated in, an image forming device, and/or image forming system. Such an image forming device and/or system may include an image source 4010, a user interface 4020, a controller/processor 4030, an image data storage unit 4040, a spot color data storage unit 4050, a tint determination unit 4060, a color recipe obtaining unit 4070, a tint data adjustment unit 4080, a color recipe conversion unit 4090, an output image formatting device 4100, and/or some manner of image sink 4110, all or individually, interconnected by one or more data/control buses 4120.

In various exemplary embodiments, input images may be obtained via the image source 4010. These input images may be, for example, vector graphics objects contained within a PDL, in order that specifically, an input image may be decomposed in order to determine individual spot colors to be rendered. Such input image data from the image source may be temporarily stored in, for example, some manner of image data storage unit 4040, or may be immediately processed via other devices and/or units within the exemplary system.

The image source 4010 is not intended to be limited to any specific type of image source, nor is the image source necessarily an integral component unit of the system 4000. The image source 4010 may be integrated with, or connected remotely to, an exemplary image forming device within which the exemplary system, or components of the exemplary system 4000 may be located.

The user interface 4020 may be provided in the form of, for example, a graphical user interface, associated directly with the exemplary system 4000, or may include such capabilities of a user interface that may be more directly associated with the image forming device and/or system within the exemplary system 4000 may be located. Such user interface 4020 may be particularly usable to query a user, and/or receive a user input, regarding any variable parameter which may, for example, modify a desired spot color rendering of a spot color object within the image forming device. Examples of such parameters include, but are not limited to, desired target trajectories in device-independent color space, for the spot color rendering.

It should be appreciated that any manner by which a user may communicate any information with the exemplary system 4000 is intended to be represented by the exemplary user interface 4020.

A controller/processor 4030 may be provided to control overall operation of the system 4000, or otherwise to specifically control individual function relating to adjusting image quality, and particularly spot color rendering within the system and/or an image forming device and/or system with which the exemplary system 4000 is associated. The controller/processor 4030 may process image data and other monitored parameters received, for example, via one or more of the connected units in making determination automatically, or with some user input via, for example, user interface 4020 within the image forming device that will support high quality spot color rendering and particularly attempts to maintain a desired color trajectory, such as a constant hue trajectory, while modifying other parameters, such as, for example, a desired tint value in the spot color rendering.

Data storage units such as those depicted as an image data storage unit 4040 and a spot color data storage unit 4050 may be provided to store data regarding operating parameters and/or a range of parameters for use within the image forming device. Particularly, it may be advantageous within the image forming device to store look-up tables for pre-determined values of individual component colors such as, for example, CMYK color recipes associated with individual spot color renderings, or otherwise any manner of commonly currently known or later-developed device-independent component parameters by which a color space and/or gamut within an image forming device may be defined. One of the commonly understood color space defining component systems currently in use is the L*a*b* component color system discussed above.

It should be appreciated that although depicted as individual data storage units, the component data storage units shown as 4040 and 4050 in FIG. 3 may be combined as a single data storage unit. Whether individual or combined data storage units, it should also be appreciated that such data storage units may include storage capacity for any manner of processing, control, and/or data information that may be advantageously employed by the exemplary system 4000.

A tint data adjustment unit 4080 may be provided that obtains, for example, a solid spot color CMYK recipe from storage 4050, converts this to a device-independent color space and applies a desired tint value to individual components of the device-independent color space, using, for example, equation (1) or some other color trajectory as specified by the user interface 4020.

A color recipe conversion unit 4090 may be provided to convert device-independent parameters defining a tint-adjusted color space to the primary component color by which the image forming device with which the system 4000 is associated may render output images. Such a color recipe conversion unit may convert, for example, tint adjusted L*a*b* values to a CMYK recipe for a specific spot color rendering in the image forming device, using previously discussed methods.

The primary color recipe for rendering an output spot color may be fed to an output image formatting device 4100 that has the capability to format data appropriately to be compatible with an output image sink 4110. It should be appreciated that the functions of, for example, a tint data adjustment unit 4080, and/or a color recipe conversion unit 4090 as described in detail above, may be incorporated into, or otherwise undertaken by the output image formatting device 4100.

The systems and methods according to this disclosure contemplate an image sink that is, for example, an output image receiving medium upon which a hard-copy image may be formed. Other image sinks 4110, however, to include for example, additional displays for review of an output image, and/or for evaluation of image quality and specifically spot color rendering adjustment for objects to be produced and/or reproduced in the image forming device, may be employed.

It should be appreciated that although generally depicted as an integral system 4000 in FIG. 3, each of the devices and/or units (depicted as internal to, or alternatively externally connected to, the exemplary system 4000) may be either units and/or capabilities internal to an image forming device, or individually, or in combination, attached to separate units by any path that facilitates data communication (such as, for example, digital data communication of image data information, and coordination) between such units and/or devices by one or more data/control buses 4120. Such data/control buses, and/or otherwise data communication, may be undertaken by, for example, one or more of a wired, a wireless, an optical, or other like connection, either individually or via some form of network communication between individual devices and/or components and the overall system 4000 supporting spot color rendering in an image forming device.

Any of the data storage units depicted or alternatively described above, may be implemented using an appropriate combination of alterable, volatile or non-volatile memory or non-alterable, or fixed memory, as these terms are currently understood, or reasonably contemplated by those of ordinary skill in the art of image formation, xerographic image formation, and/or image data communication.

It should be appreciated that given the required inputs, to include, but not limited to, appropriate information regarding modifiable parameters and desired spot color renderings in an image forming device, as generally described above, and/or inputs regarding differing capabilities for image quality adjustment particularly with regard to spot color rendering, in image formation, production and/or reproduction, particularly associated with the systems and methods described above, software algorithms, hardware/firmware circuits, or any combination of software, hardware and/or firmware control elements may be used to implement the individual devices and/or units such as those depicted in, for example, the exemplary system 4000 or the individual units and/or devices in varying combinations as are described in general above.

The computations necessary to establish and/or to determine object spot color rendering in image formation in an image forming device may be implemented within a circuit in the image forming device itself. Alternatively, such computations may be performed on a programmable general purpose, or special purpose computer, program microprocessor or microcontroller, or other like digital signal processing device. These other like digital signal processors may include, but are not limited to, peripheral integrated circuit elements, ASIC, or other integrated circuits, hard-wired electronic or logic circuits, such as, for example, discrete element circuits, programmable logic devices or the like. Individual devices may be manipulated through manual adjustment of one or more operating parameters and/or user-adjustable input parameters that may be associated with one or more of the operating parameters of the exemplary system 4000.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A computer implemented method for forming a target color in an image, the target color being intermediate between a spot color and a second color, the method comprising:
   receiving CMYK colorant recipes for the spot color and the second color, and a mixture percentage value that indicates the proportion of the spot color relative to the second color;
   converting the device CMYK colorant recipes for the spot color and the second color to respective base sets of color space referencing component values;
   calculating a desired set of color space referencing component values corresponding to the target color based on the base sets of color space referencing component values of the spot color and the second color, and the mixture percentage value that indicates the proportion of the spot color relative to the second color;

determining a particular CMYK colorant recipe that produces the set of color space referencing component values for the target color; and forming an output image containing the target color, wherein:

the step of determining the particular CMYK colorant recipe comprises the further steps of:

fixing a $K_n$ value for the recipe according to the formula: $K_n = K_0 + n \cdot (K_1 - K_0)$; and selecting $C_n$, $M_n$, and $Y_n$ values corresponding to $K_n$ that produce the desired color space referencing component values, where n is a mixture percentage value of the two colors, $K_1$ is a K colorant of the spot color, and $K_0$ is a K colorant of the second color.

2. The method of claim 1, wherein the second color is the white color of the medium on which the spot color is rendered, which is represented by a CMYK colorant recipe with zero values for each CMYK colorant, and whereby the target color is a tint of the spot color.

3. The method of claim 1, wherein the second color is a second spot color that has a CMYK colorant recipe associated with it.

4. The method of claim 1, wherein:

in an offline phase, the steps of receiving, converting, calculating and determining of target CMYK colorant recipes are pre-executed for a set of N intermediate nodes, $1 \leq N \ll 100$, corresponding to predetermined mixture percentage values, in an offline phase, the CMYK colorant recipes of the spot color and the second color, corresponding respectively to 100 and 0 mixture percentage values, are added to the set of nodes, and in a real-time phase, the CMYK colorant recipe of the target color corresponding to a mixture percentage value is calculated by interpolation among colorant recipes at selected nodes.

5. The method of claim 4, wherein the interpolation is linear interpolation and the selected nodes are the two nodes corresponding respectively to mixture percentage values immediately less than and greater than that of the target color.

6. The method of claim 1, wherein the output image contains a sweep which is generated as a series of target colors corresponding to a progressive sequence of mixture percentage values.

7. The method of claim 1, wherein the output image is a monochrome pictorial which is generated as a collection of tints.

8. The method of claim 1, wherein
the color space referencing components include L*, a*, and b*, and
wherein L* is a lightness-darkness scale value, a* is a red-green scale value, and b* is a yellow-blue scale value.

9. The method of claim 1, wherein the CMYK recipe of the spot color is obtained from a pre-determined table.

10. The method of claim claim 1, wherein the CMYK recipe of the spot color is obtained from a user customizable table of pre-determined values.

11. The method of claim 9, wherein the color space referencing component values of the color space for the target color are calculated using the formula:

$$(L_n, a_n, b_n) = (L_0 + n \cdot (L_1 - L_0), a_0 + n \cdot (a_1 - a_0), b_0 + n \cdot (b_1 - b_0))$$

where $L_1, a_1, b_1$ is the base set of referencing component values for the spot color, where $L_0, a_0, b_0$ is the base set of referencing component values for the second color, and where n is a mixture percentage value of the two colors for the target color.

12. The method of claim 1, wherein the step of selecting $C_n$, $M_n$, and $Y_n$ values corresponding to $K_n$ is accomplished by iterating on a forward printer model.

13. The method of claim 1, wherein if a valid CMYK recipe does not exist using the $C_n$, $M_n$, and $Y_n$ values corresponding to $K_n$ for the desired color space referencing component values, selecting a CMYK recipe having a K as close as possible to the desired $K_n$.

14. The method of claim 1, wherein the step of converting the set of component values of the color space to the CMYK recipe contains the further steps of:

selecting a CMYK recipe that minimizes a cost function.

15. The method of claim 14, wherein the cost function is $$\Sigma \lfloor w_c \cdot (C_{Tn} - C_n)^2 + w_m \cdot (M_{Tn} - M_n)^2 + w_y \cdot (Y_{Tn} - Y_n)^2 + w_k \cdot (K_{Tn} - K_n)^2 \rfloor,$$

where $C_n$, $M_n$, $Y_n$, $K_n$ are the CMYK colorant recipes corresponding to a mixture percentage value n, $C_{Tn}$, $M_{Tn}$, $Y_{Tn}$, $K_{Tn}$ are predetermined target recipe values for that mixture percentage value, and $w_c$, $w_m$, $w_y$, $w_k$ are predetermined or dynamically-determined weighting coefficients.

16. The method of claim 15, wherein the predetermined target recipe values are those of an adjacent mixture percentage value that has already been calculated.

17. The method of claim 15, wherein the predetermined target recipe values are those determined by linearly interpolating between the CMYK colorant recipes of the spot color and the second color, at a mixture percentage value n.

18. The method of claim 16, wherein the weighting coefficients are $w_c = 1$, $w_m = 1$, $w_y = 1$, $w_k = 3$.

19. An apparatus for printing a spot color object having a target color intermediate between a spot color and a second color, represented by a mixture percentage value that indicates the proportion of the spot color relative to the second color, comprising:

an input unit for inputting a spot color object;

a first converting unit for converting device colorant recipes for emulating the spot color and the second color to base sets of referencing component values of a color space;

a processor for calculating a desired set of referencing component values of a color space representing the target color intermediate between the spot color and the second color, represented by a mixture percentage value that indicates the proportion of the spot color relative to the second color;

a second converting unit for converting the set of referencing component 1 values of a color space representing the target color to a particular device colorant recipe for the target color; and an image sink for rendering the target color of the spot color object as at least a portion of an output image wherein:

the device colorant recipes are CMYK recipes; and the second converting unit fixes a $K_n$ value for the recipe according to the formula: $K_n = K_0 + n \cdot (K_1 - K_0)$ and the second converting unit selects $C_n$, $M_n$, and $Y_n$ values corresponding to $K_n$ that produce the desired set of color space referencing component values, where n is a mixture ercenta e value of the two colors $K_1$ is a K colorant of the s of color, and $K_0$ is a K colorant of the second color.

20. The apparatus of claim 19,
wherein the referencing components of the color space include L*, a*, and b*, and
wherein L* is a lightness-darkness scale value, a* is a red-green scale value, and b* is a yellow-blue scale value.

21. The apparatus of claim 19, wherein the apparatus is a xerographic image forming device.

22. A non-transitory, computer-readable storage medium on which is stored a program for causing a computer to execute the method of claim 1.

* * * * *